Patented Nov. 12, 1929

1,735,123

UNITED STATES PATENT OFFICE

WALTER MIEG, OF VOHWINKEL, AND HEINRICH RAEDER, OF LEVERKUSEN, NEAR COLOGNE, GERMANY, ASSIGNORS TO GENERAL ANILINE WORKS, INC., OF NEW YORK, N. Y., A CORPORATION OF DELAWARE

DIANTHRAQUINONYLAMINE SULPHONIC ACID DYESTUFF

No Drawing. Application filed August 17, 1925, Serial No. 50,868, and in Germany September 27, 1924.

We have invented new and useful improvements in dianthraquinonylamine sulphonic acid dyestuffs.

Our invention consists in the sulphonation of dianthraquinonylamines and in the substantially pure dianthraquinonylamine sulphonic acids obtained by our novel process.

Dianthraquinonylamines having the general formula $C_{14}H_7O_2$—NH—$C_{14}H_7O_2$ have first been produced by condensing aminoanthraquinones with halogen anthraquinones. This reaction, as well as the products obtained by it, are described for instance in U. S. Patent #814,137. It is stated in this patent that by treating dianthraquinonylamines with sulphonating agents at temperatures from 100–130° C., dyestuffs are produced which dye wool from an acid bath, fast shades. This reaction has, however, never found any practical application.

We have now found that the treatment of unsubstituted dianthraquinonylamines as stated in the above mentioned patent with sulphonating agents, is a very complex reaction and that a mixture of different compounds is formed, which produces on animal fibres unsightly and valueless shades. The two main reactions involved in the treatment of dianthraquinonylamines with sulphonating agents consists in a straight sulphonation and in a joint sulphonation and oxidation.

We have now found that sulphonation proceeds at lower temperatures, and we have further found the correct conditions whereby straight dianthraquinonylamine sulphonic acids are produced without the production of any substantial amounts of oxidation products; substantially pure dianthraquinonylamine sulphonic acids, can be recovered directly from the reaction.

The dyeing properties, particularly shades, of the new products are quite different from those of the old mixed sulphonation products or from the oxy-dianthraquinonylamine sulphonic acids described in our United States Patent No. 1,564,091 filed at even date. The novel, straight dianthraquinonylamine sulphonic acids are furthermore distinguished by a very characteristic reaction. Addition of formaldehyde to their solutions in concentrated sulfuric acid produces a marked change in the color of these solutions. In the case of the oxy-dianthraquinonylamine sulphonic acids no such change of color occurs.

The process of producing our novel dianthraquinonylamine sulphonic acids consists in treating dianthraquinonylamines with moderately concentrated fuming sulfuric acid, i. e., fuming sulfuric acid containing not more than 30% free $SO_3$, at temperatures below 100° C. It is possible by varying the concentrations, temperatures, etc. within the above conditions, to obtain mono, di, and eventually higher sulphonated dianthraquinonylamine sulphonic acids. Preferably, temperatures between 80 to 100° C. are used for the production of the poly-sulphonic acids. Practically no oxidation occurs under the conditions described herein, and the straight sulphonic acids obtained are practically free from hydroxy-dianthraquinonylamine sulphonic acids and other oxidation products.

The novel straight dianthraquinonylamine sulphonic acids are in the form of their sodium salts brownish-red, crystalline substances, difficultly soluble in water with from orange to yellowish brown colors, nearly insoluble in dilute mineral acids, and soluble in concentrated sulfuric acid with from reddish-brown to violet-blue colors. Addition of formaldehyde, as well as addition of boric acid to these solutions completely changes their colors. Our new products dye animal fibres from an acid bath from orange to yellowish-brown colors.

The dianthraquinonylamines particularly suited for our novel process are the 1-1′- dianthraquinonylamine, having most probably the following formula

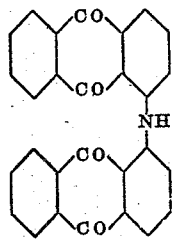

and the 1-2'-dianthraquinonylamine of the probable formula,

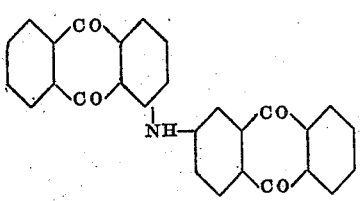

In order to further illustrate our invention the following examples are given, the parts being by weight.

*Example 1.*—10 parts 1-1'-dianthraquinonylamine are dissolved in 100 parts 15% oleum and heated for a short time to 95–100° C. until a test sample is completely soluble in hot water with a yellowish-brown color. The cooled metal is then stirred, without any further cooling, into 1000 parts water. Saturated sodium chloride solution is then added at boiling temperature until a test simple, after cooling, shows that the dyestuff is completely salted out. The product is after cooling filtered off, washed to neutrality with dilute sodium chloride solution and dried.

The product so obtained is substantially free from oxidation products and is the sodium salt of a disulphonic acid, having most probably the formula

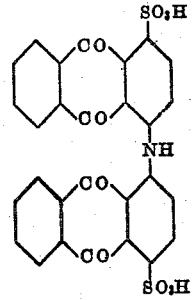

It can be called the 1-1'-dianthraquinonylamine-4-4' disulphonate of sodium.

The product is somewhat soluble in cold water, more easily soluble in hot water with a yellowish-brown color from which it is obtained as yellowish-brown needles by salting out with sodium chloride. It is soluble in concentrated sulfuric acid with a reddish-brown color. Addition of formaldehyde to this solution turns its color to blue and addition of boric acid to reddish-violet. It dyes wool in an acid bath exceedingly fast yellowish-brown shades, which are not changed by afterchroming. The same shade is obtained on chrome mordanted wool.

*Example 2.*—10 parts 1-1'-dianthraquinonylamine are treated for a short time at 30° C. with 100 parts 25% oleum. The melt is drowned in water, salted out, filtered off and dried. It is probably 1-1'-dianthraquinonylamine 4-sulphonic acid, being very difficultly soluble in water, soluble in strong sulfuric acid with a green coloration, turning to blue after the addition of formaldehyde, dyeing wool from an acid bath reddish-brown fast shades.

*Example 3.*—10 parts 1-2'-dianthraquinonylamine are treated for a short time at 95–100° C. with 100 parts 15% oleum, until the product is entirely soluble in water. The melt is poured into water, salted out, filtered and dried.

The dyestuff obtained is the sodium salt of a 1-2'-dianthraquinonylamine disulphonic acid. It is a reddish-brown, crystalline powder, difficultly soluble in cold water, somewhat better soluble in hot water with an orange color. It is soluble in concentrated sulfuric acid with a deep violet-blue color, which turns to a pure violet by the addition of formaldehyde. It dissolves in concentrated sulfuric acid containing boric acid with a reddish-violet color. It dyes wool in an acid bath, clear yellowish-orange shades of excellent fastness properties.

We claim:

1. The process of sulphonating 1-1'-dianthraquinonylamine with fuming sulfuric acid containing not more than 30% free $SO_3$ at temperatures below 100° C.

2. In processes of producing 1-1'-dianthraquinonylamine-4-4'-disulphonic acid the step comprising sulphonating 1-1'-dianthraquinonylamine with oleum containing not more than 30% free $SO_3$ and at temperatures between 80 and 100° C.

3. As new products the compounds of the probable formula:

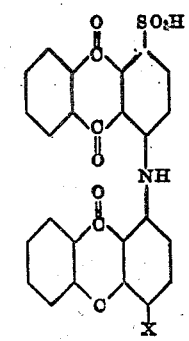

wherein $x$ stands for hydrogen or a sulphonic acid group, said compounds being soluble in strong sulfuric acid with green to reddish-brown colorations, turning to blue after the addition of formaldehyde, dyeing wool from an acid bath reddish-brown to yellowish-brown shades.

In testimony whereof we have hereunto set our hands.

WALTER MIEG.
HEINRICH RAEDER.